(12) United States Patent
Williams

(10) Patent No.: US 11,718,040 B2
(45) Date of Patent: Aug. 8, 2023

(54) 3D PRINTED SCULPTURES AND PROCESS

(71) Applicant: Drew Alexander Williams, Mount Laurel, NJ (US)

(72) Inventor: Drew Alexander Williams, Mount Laurel, NJ (US)

(*) Notice: Subject to any disclaimer, the term of this patent is extended or adjusted under 35 U.S.C. 154(b) by 342 days.

(21) Appl. No.: 17/169,953

(22) Filed: Feb. 8, 2021

(65) Prior Publication Data

US 2022/0250326 A1    Aug. 11, 2022

Related U.S. Application Data

(60) Provisional application No. 62/978,294, filed on Feb. 18, 2020.

(51) Int. Cl.
| | |
|---|---|
| *B29C 64/393* | (2017.01) |
| *A42B 1/248* | (2021.01) |
| *B29C 64/10* | (2017.01) |
| *B44C 3/06* | (2006.01) |
| *B33Y 50/02* | (2015.01) |
| *B33Y 80/00* | (2015.01) |
| *B33Y 10/00* | (2015.01) |

(52) U.S. Cl.
CPC ............ *B29C 64/393* (2017.08); *A42B 1/248* (2013.01); *B29C 64/10* (2017.08); *B44C 3/06* (2013.01); *B33Y 10/00* (2014.12); *B33Y 50/02* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 6,163,889 A | 12/2000 | Tate | |
| 6,175,963 B1 | 1/2001 | Loeffrelholz | |
| 10,011,074 B2 | 7/2018 | Cheng et al. | |
| 10,303,158 B2 | 5/2019 | Chang et al. | |
| 10,429,821 B2 | 10/2019 | Shen et al. | |
| 2015/0258770 A1 | 9/2015 | Chan et al. | |
| 2015/0343704 A1 | 12/2015 | Stahl et al. | |
| 2018/0143617 A1* | 5/2018 | Shen | B29C 64/106 |
| 2018/0186089 A1 | 7/2018 | Chang et al. | |
| 2020/0027279 A1* | 1/2020 | Arpa | G06T 19/20 |

FOREIGN PATENT DOCUMENTS

| | | | | |
|---|---|---|---|---|
| CN | 106663334 A | * | 5/2017 | ............ G06K 9/4604 |
| KR | 20150144075 A | * | 12/2015 | |
| KR | 20160000275 A | * | 1/2016 | |
| KR | 20190067586 A | * | 6/2019 | |

\* cited by examiner

*Primary Examiner* — Suresh Suryawanshi

(74) *Attorney, Agent, or Firm* — Thomas J. Germinario

(57) ABSTRACT

A process is presented for creating 3D sculptures using a 3D printer. The 3D sculptures form a foreground for a 2D base image also applied by the 3D printer. The process involves using a 3D printer to apply colors and/or images like a conventional 2D printer while the 3D product is being created. A 2D base design is combined with a 3D sculpture design to create an integral "canvas" which faces outward from the base and presents a 3D image emerging from a 2D background. The completed "canvas" can then be attached to an apparel item, such as a hat, or an accessory item, such as a bag, using magnets or other conventional mechanical attachment means.

6 Claims, 7 Drawing Sheets

3D PRINTED SCULPTURES AND PROCESS

REFERENCE TO RELATED APPLICATION

This application claims the benefit of the filing date of U.S. provisional utility application No. 62/978,294, filed Feb. 18, 2020, the disclosure of which is incorporated herein by reference.

FIELD OF THE INVENTION

The present invention relates to 3D printed objects and processes. More particularly, the invention relates to sculptures produced by a 3D printing process to apply images and 3D sculptures to a base design and give it a mobile nature using magnets. The present invention relates to sculptures mounted to hats using magnets, as well as sculptures mounted using magnets to a wider range of products including clothing, bags, accessories and other items.

BACKGROUND OF THE INVENTION

3D Printing is an open manufacturing platform for people and businesses to take advantage of for profit or pleasure. As this is still a relatively new manufacturing method for people to use, the range of products available is limited. Having an open nature allows anyone that makes use of this technology to have an almost complete manufacturing and supply chain available to them to grow a business, brand or personal project.

One of the drawbacks to 3D printing at the moment is the lack of ability to print a wide range of materials and objects in full color and have them in a near-finished state. This drawback limits the market for 3D printing because people who do not have any 3D modeling experience do not see enough value to get involved with the technology. There are processes in place for adding color and images but they are expensive, time-consuming, and difficult for anyone other than a corporation to setup and maintain. These current processes also require the use of more than one machine.

More cost-effective and simpler color printing is available at the moment using professional 3D printers available through 3D printing services. These printers are currently being used with the mindset that the only colors or designs that can be printed are standard textures. In this case a texture is considered to be a generic image whose sole purpose is to be a general design to give an element of a 3D printed object a personality. For example, you could have a texture of grass and use it to print onto a 3D printed object to show that a given area shown is grass. Another example could be a brick texture, used to show that a given printed area is composed of bricks.

Because of these current processes there is a need for additional methods, processes and products to be created to open up the 3D printing industry even further for people to use for their gain.

BRIEF SUMMARY OF THE INVENTION

The present invention comprises a novel 3D printing manufacturing process, novel base design, novel design process and novel mounting method that when combined as a whole, or in parts, creates a new mobile art form that can be altered for personal gain. This process starts by using a base design, or canvas, that is transformed through the use of images and sculptures into a final product. Adding a magnetic attachment system to this 3D printed object gives it a mobile nature allowing it to be mounted to hats, clothing, backpacks, purses, hand-bags, and other similar items.

There are professional grade 3D printers that print in color using technology that is applied in the same way a current 2D printer does when printing on a piece of paper. 3D printers build objects in a similar fashion by applying materials in layers, like pieces of paper, on top of each other. Using this same process of applying colors or images like a traditional 2D printer leads to the novel process of using the color application of a 3D printer in a traditional 2D manner to print images onto a base design instead of just printing textures or colors onto sculptures. While the 3D printer is still being utilized to create a 3D product, it is simultaneously being used as a conventional 2D printer to apply images and artwork to the product while it is being created, thereby producing a novel product that comes out of the printer in a nearly finished state and ready for sale. While using a 3D printer to apply textures and colors is not novel, this base design format and process to 3D print actual images like paintings, drawings and photos onto a product is novel.

These base designs face outwards towards people and act like a canvas used for a painting or drawing, instead of supporting a sculpture from the bottom like the base of a statue, which has normally been done in 3D printing. By configuring the design this way and applying the 3D printing process mentioned in the paragraph above, real images and artwork can be applied to the base design while also adding 3D elements, so that the entire product is manufactured using only a 3D printer.

In one embodiment of the present invention, the 3D printed product is attachable to hats, clothing, bags, or other items, using a novel configuration of magnets. There are two parts to this configuration. The first part is magnets attached to the back of the 3D printed base design and the second part is an additional accompanying 3D printed piece with magnets. This additional accompanying piece, called a 'backer', is placed inside and opposite of the base design, whether it is on a hat, piece of clothing or other item, and secures the 3D printed design on the outside.

Combining these ideas of a novel printing process, novel base design, novel design process and novel mounting method leads to a novel art form. This base design and process gives anybody the ability to create their own art products with a professional manufacturing process ready to produce and scale as needed. By utilizing the base design to face outward and use images and artwork, 3D printing as a manufacturing method becomes more accessible for traditional 2D artists who may not have any experience with 3D modeling. Adding this accessibility adds more significance to this process because it adds value to the technology for people that did not previously have a use for it. This process joins together the digital world of images with a set of viable, real world products, using one machine that is accessible to almost anyone. Further, the products that can be created with the base designs and process of this invention give 3D artists additional ways to profit from their work.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New 3D printing techniques and designs are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1A:
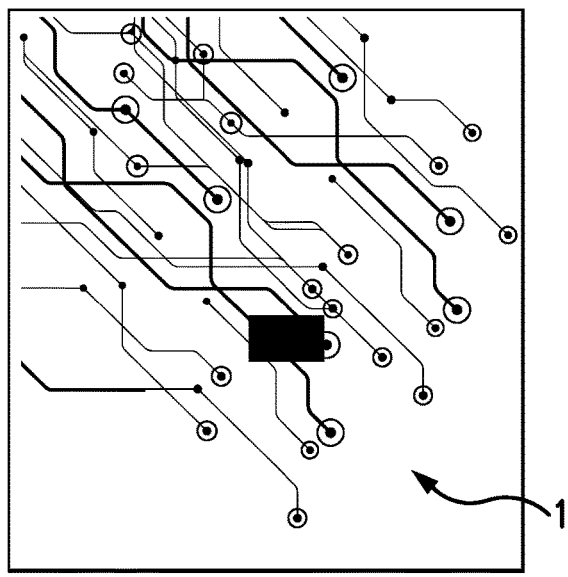
FIGS. 1A-1D depict an example process flow of taking a base image (FIG. 1A), applying it to the base design (FIG. 1B), adding 3D elements (FIG. 1C), and adding magnets (FIG. 1D).
Figure 1B:
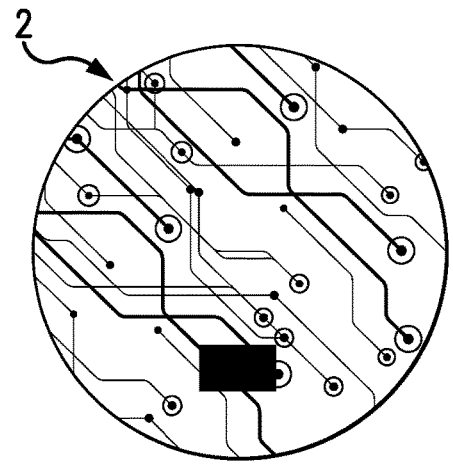
Figure 1C:
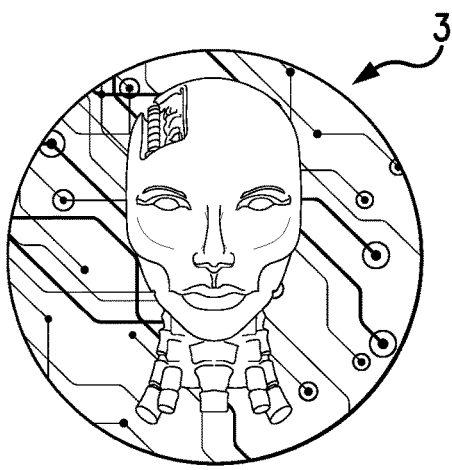
Figure 6:
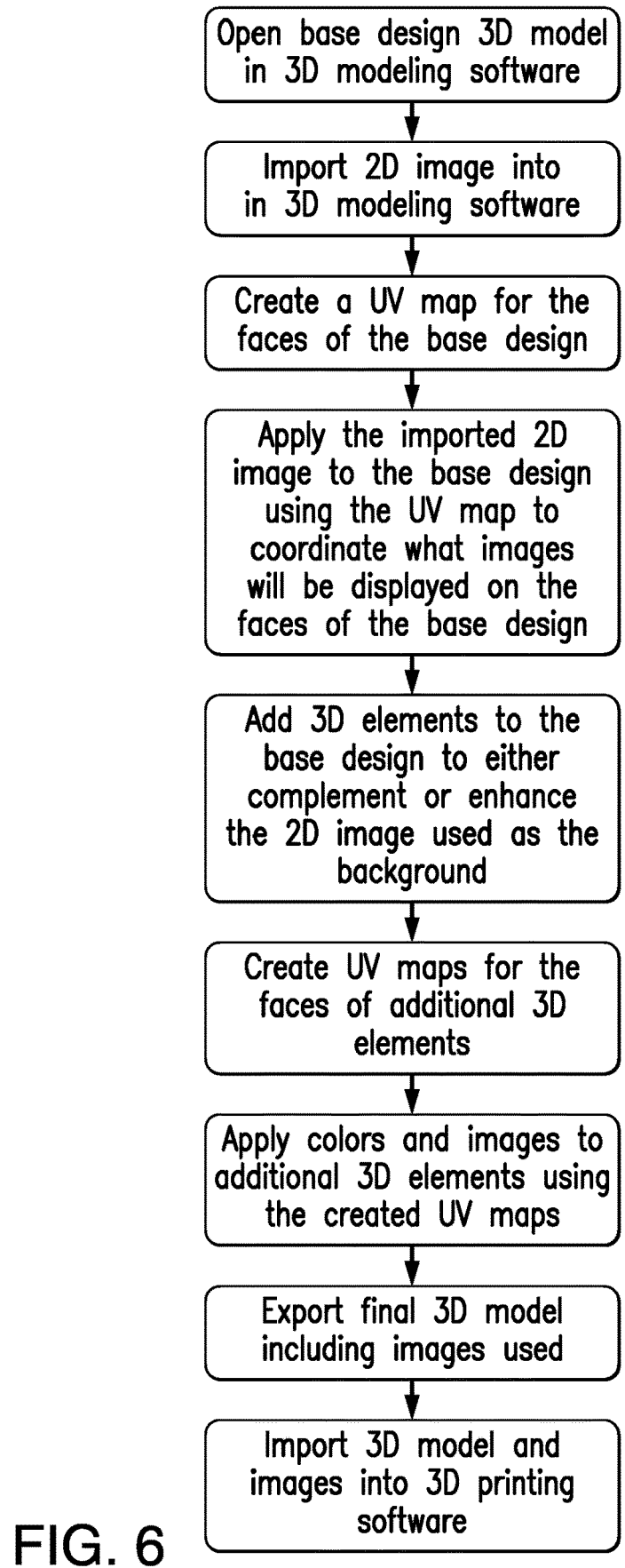
FIG. 6 is a flow chart of the process using a 3D printer to apply colors and/or images like a conventional 2D printer while the 3D product is being created. A 2D base design is combined with a 3D sculpture design to create an integral "canvas" which faces outward from the base and presents a 3D image emerging from a 2D background.

The present invention will now be described by referencing the appended figures representing preferred embodiments. FIGS. 1A-1D show the overall process flow to create one of the designs of this invention. Starting in FIG. 1A, an image is displayed in a normal 2D format [1]. As shown in FIG. 1B, this image is then applied to a circular base design. This process of applying a 2D image to a 3D object is done through 3D modeling software by importing the image and creating a UV map to associate it with the faces of a 3D model (FIG. 6). By using these base designs as canvases that face outward [2], instead of acting as a support like the bottom of a statue or trophy, any image can be imported into the 3D software and applied to the base design as a background, which can then be 3D printed.

Certain 3D printers have the capability to print images in the same way a traditional 2D printer does through the use of ink-jet or laser technology. By utilizing the 3D printer in a fashion similar to a traditional 2D printer, the image that has been added to the base design will be applied by the 3D printer while simultaneously printing the actual 3D object FIG. 6. This process leads to a near finished product coming right out of the 3D printer without requiring additional work to add images or colors. This process of using any 2D image on a 3D printed base design creates a bridge between the digital world of 2D images and tangible 3D printed products, making the technology more accessible. Additionally, being able to automate the manufacturing of products using custom art, without requiring additional work from the artist, is very valuable. This process could also be developed further by taking a 2D image and turning it into a 3D product, most 2D images have a third-dimension aspect that can be developed. An example of this would be taking an image of a person and turning the 2D representation of the person into a 3D sculpture.

Choosing an image [1] and applying it to the base design [2] (FIG. 1B) does not necessarily have to be the first step. 3D sculptures could be mounted to the base design first with a background image chosen later. Following the process flow outlined in FIGS. 1A-1D though, once the image has been added to the base design, 3D sculptures, or 3D elements, are then added [3] which can be seen in FIG. 1C. What can be added to the base design [3] at this point is basically limitless as this is a novel art form that can take advantage of existing sculptures as well as new sculptures.

Adding 3D elements [3] to the base design can be executed in a few ways. One way is to use an image as a background [2] that complements the sculpture but isn't the primary focus of the overall design. Another way is to use the background image as the primary building block and have 3D elements that project outward giving depth and additional perspective to the image used, not just as a complementary part of the overall design. Either method can be used to create novel pieces of art that tell a story.

Figure 1D:
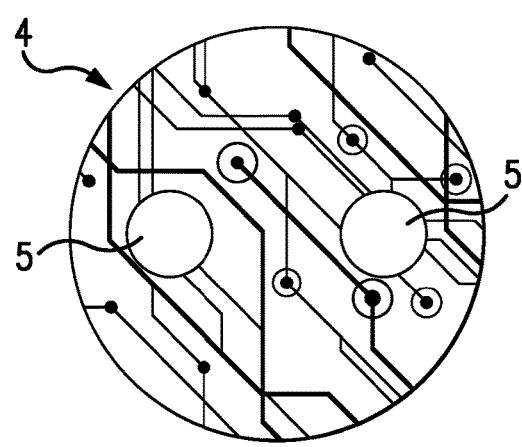
Figure 7:
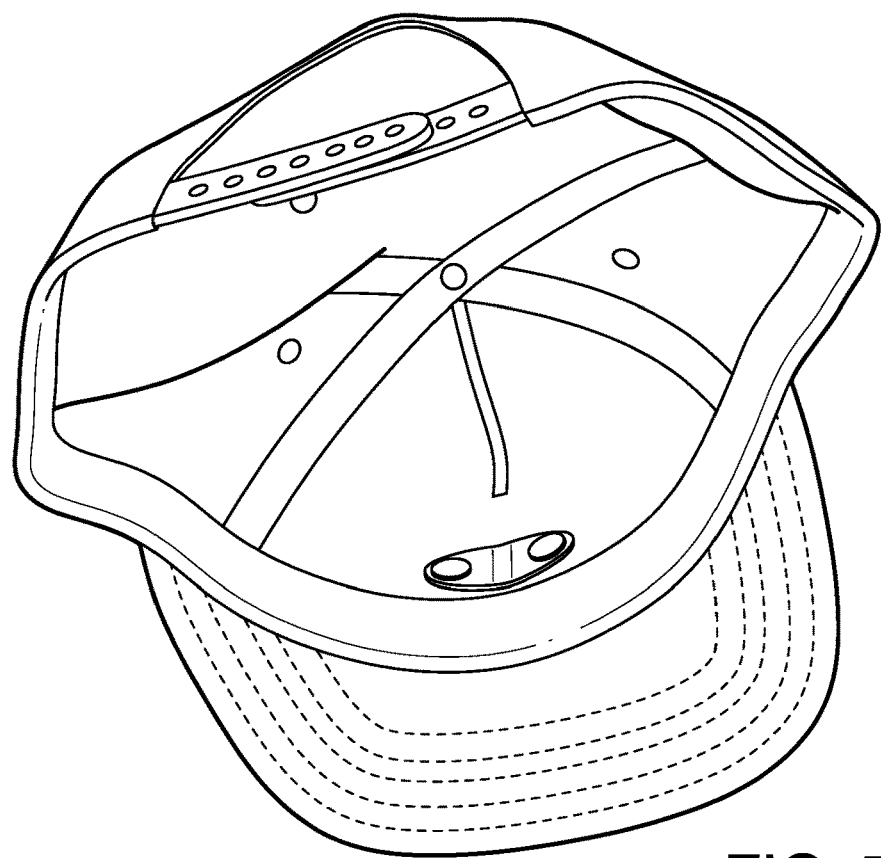
FIG. 7 shows a perspective view of the inside of a hat where the backer piece sits and completes the magnetic connection with the object on the front.

FIG. 1D depicts the final 3D printed product [4] with the base magnets [5] added. FIGS. 5B-5D depict the backer magnets [75] that would be placed on the inside of a hat as shown in FIG. 7. These backer magnets can be curved (FIGS. 5B-5D) or flat (FIGS. 2B-2D) depending on which base design (FIGS. 3B, 4B) they are meant to fit.

Figure 3A:
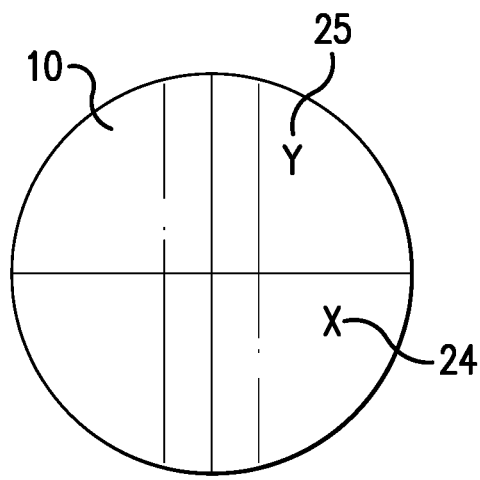
FIGS. 3A-3D depict front, bottom, back, and side perspective views for a circular base design/canvas that would be used for creating the art that is attached to a hat, the design being curved to match the curvature of the front of a standard hat.
Figure 3B:
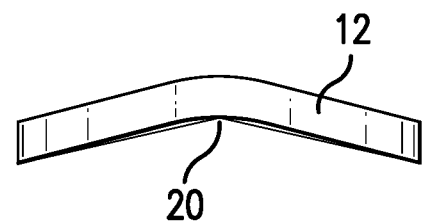
Figure 3C:
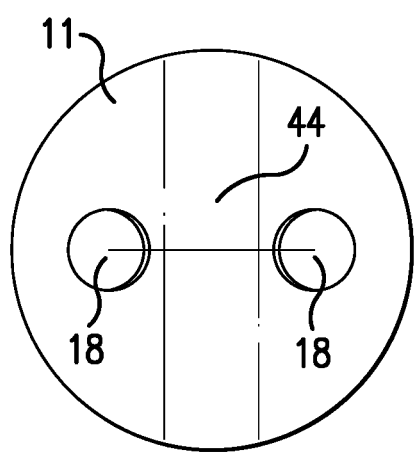
Figure 3D:
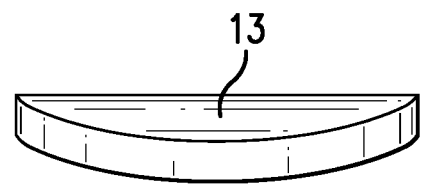
Figure 4A:
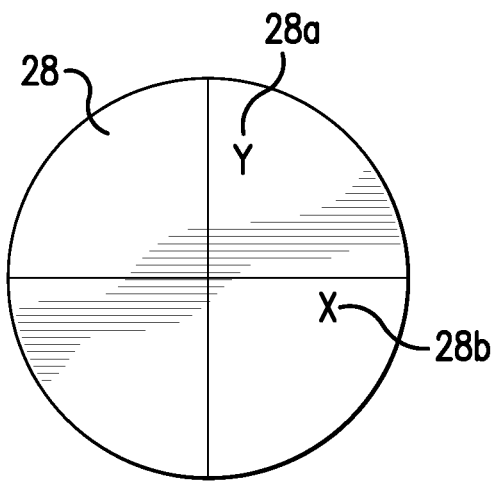
FIGS. 4A-4D depict front, bottom, back, and side perspective views of a flat circular base design attachable to clothing, bags, purses or other items.
Figure 4B:
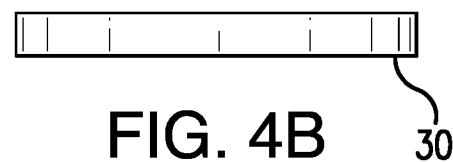

While the object being created in FIGS. 1A-1D would be mounted to a hat, this entire process can be applied to create novel art designs to attach to clothing, bags or other accessories using a flat base design (FIG. 4B). FIG. 2A-2D shows an example of the process being used to create those designs. In FIGS. 2A-2D, a 3D rendering is shown of a design created using the same process from FIGS. 1A-1D but using a flat circular base (FIGS. 4A-4D) instead of a curved base design (FIGS. 3A-3D). Using this flat base (FIGS. 4A-4D) is what would allow the design to be mounted to items such as clothing and bags that have a flatter surface than a hat.

Figure 4C:
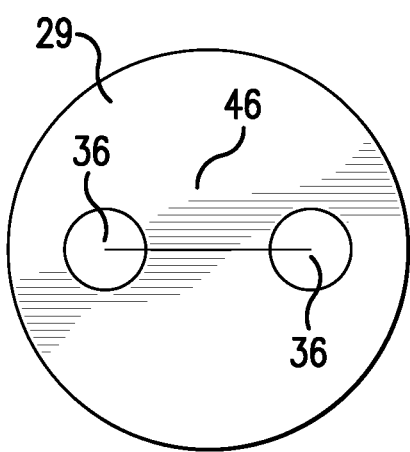
Figure 4D:
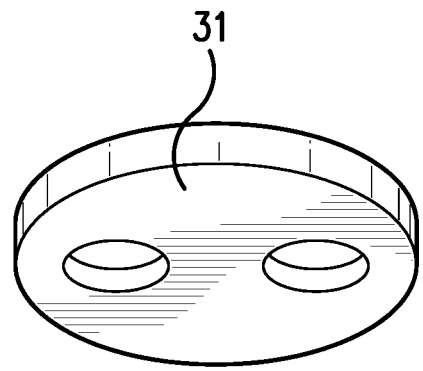
Figure 5A:
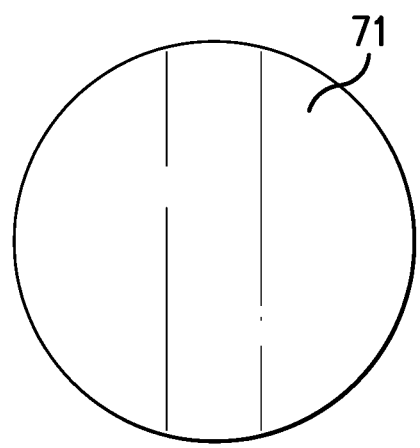
FIGS. 5A-5D depict front, bottom, back, and side perspective views of the circle base design with the accompanying 'backer' piece that is inserted on the inside of the hat.
Figure 5B:
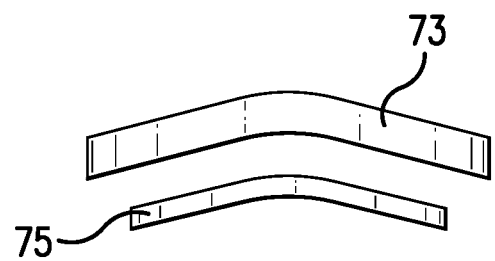
Figure 5C:
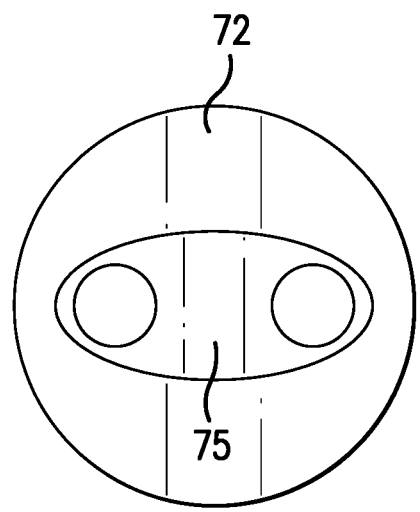
Figure 5D:
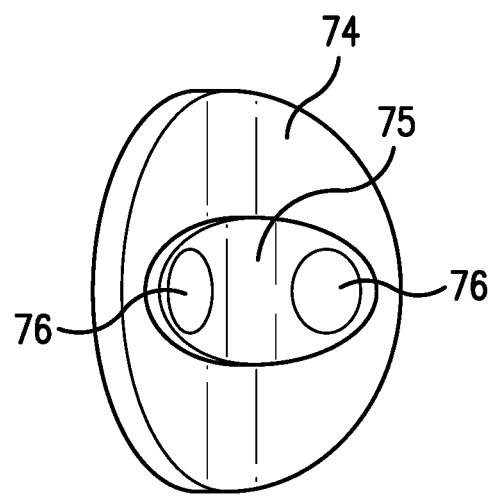

In FIGS. 3A-3D are shown the base design that would be used for hats, FIGS. 3A-3D show the front [10], back [11], bottom [12] and side view [13] for a curved circle base design. The holes [18] [36] where the magnets would be placed can also be seen on the back [11] of these hat base designs (FIGS. 3C and 4C).

FIGS. 4A-4D show how the same circle design could be used to create items for clothing, bags and other accessories by using a flat base. FIGS. 4A-4D show the front [28], back [29], side [30] and angled back view [31] for a flat circle base design. The holes [36] where the base magnets would be placed can also be seen on the back [29] of these flat base designs. In other embodiments hexagons, rectangles, squares, stars and other shapes could be used as a base design for this process.

Figure 2A:
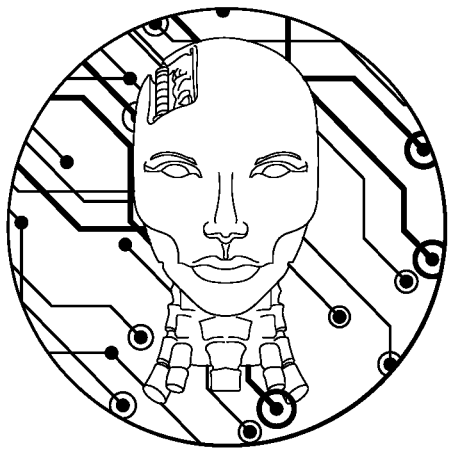
FIGS. 2A-2D depict front, bottom, back, and side perspective views of the process being used to make a novel piece of art using a circular base design, with two magnets, that could be attached to clothing, bags, purses or other items.
Figure 2B:
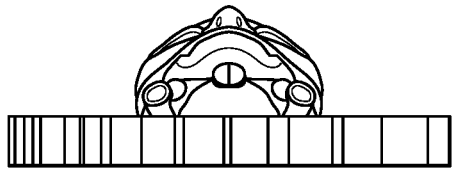
Figure 2C:
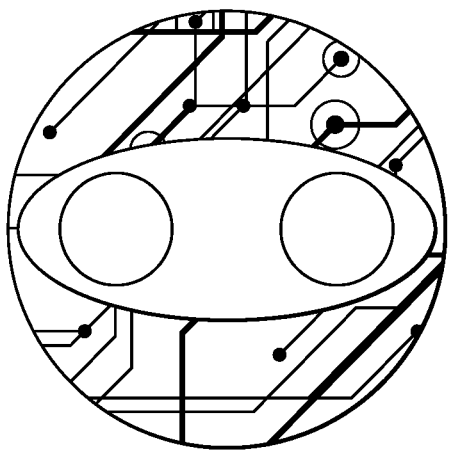
Figure 2D:
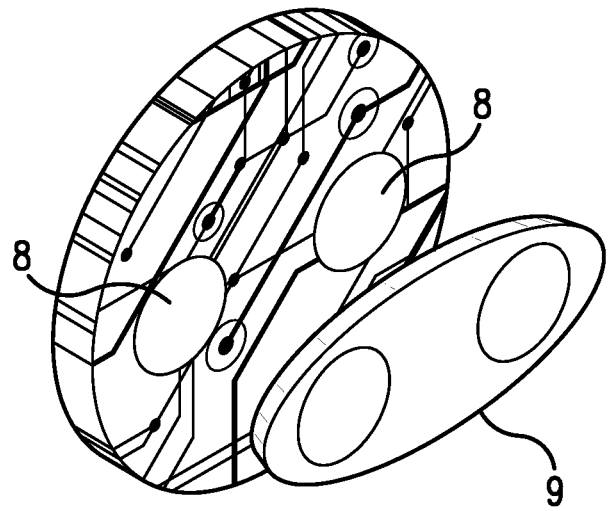

FIGS. 2B-2D and FIGS. 5B-5D show different variations and angles for 'backers' that would accompany these base designs to mount them. FIGS. 5B-5D show the 'backer' [75] designs that would be used to secure base designs (FIGS. 3A-3D) that are mounted to a hat. FIGS. 2B-2D show the 'backer' [9] designs that would be used to secure flat base designs (FIGS. 4B-4D) that are mounted to items such as bags or clothing. In other embodiments hexagons, rectangles, squares, stars and other shapes could be used as a 'backer' design.

Figure 8:
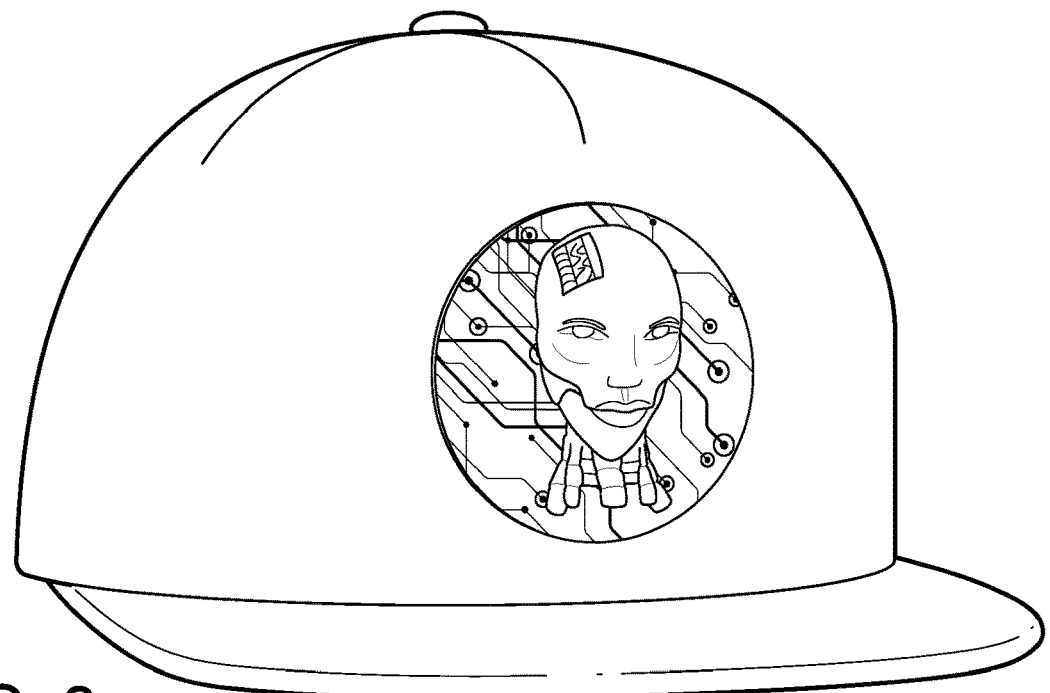
FIG. 8 shows a perspective view of the completed product from FIG. 1 mounted on the front of a hat.

FIG. 8 shows a completed design that has been printed and attached to the front of a hat. FIG. 7 shows the same hat with the 'backer' placed on the inside to secure the circle base design. FIG. 6 is a flow chart of the process using a 3D printer to apply colors and/or images like a conventional 2D printer while the 3D product is being created. A 2D base design is combined with a 3D sculpture design to create an integral "canvas" which faces outward from the base and presents a 3D image emerging from a 2D background.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A colored object produced by a 3D printer with 3D modeling software comprising
   a base element, having a front face and a back face, wherein the front face displays a two-dimensional front base image that is applied in color by the 3D printer, wherein the two-dimensional front base image is imported into the 3D modeling software, and wherein a front base UV map of the front face of the base element is used to coordinate application by the 3D printer of the two-dimensional front base image to the front face of the base element;
   a three-dimensional mounted element, defined by multiple two-dimensional transverse contour lines, wherein the mounted element integrally extends from the front face of the base element, and wherein the mounted element displays a three-dimensional mounted image that is applied in color by the 3D printer, and wherein multiple foreground UV maps, created for each of the multiple two-dimensional transverse contour lines of the three-dimensional mounted element, are used to coordinate application by the 3D printer of the three-dimensional mounted image to the three-dimensional mounted element; and
   wherein the three-dimensional mounted image, when viewed orthogonally to the front face of the base element, merges with the two-dimensional front base image to form a composite image, in which the three-dimensional mounted image defines an image foreground and the two-dimensional front base image defines an image background.

2. The colored object according to claim 1, wherein the base element has flat or curved plate structure.

3. The colored object according to claim 2, wherein the two-dimensional contour lines of the mounted element form a sculpture.

4. The colored object according to claim 3, wherein the back face of the base element displays a two-dimensional back base image that is applied in color by the 3D printer, wherein the two-dimensional back base image is imported into the 3D modeling software, and wherein a back base UV map of the back face of the base element is used to coordinate application by the 3D printer of the two-dimensional back base image to the back face of the base element.

5. The colored object according to claim 1, where one or more base magnets are embedded in the back face of the base element, and wherein the base magnets are operable to secure the colored object to an apparel material by the attraction of the base magnets to one or more backer magnets located on a side of the apparel material opposite the base magnets.

6. A process for producing the colored object according to claim 4, comprising the following steps:
   (a) providing a 3D modeling software;
   (b) opening the base element in the 3D modeling software;
   (c) importing the two-dimensional front base image and the two-dimensional back base image into the 3D modeling software;
   (d) creating base UV maps of the front face and the back face of the base element;
   (e) using the base UV maps to coordinate application of the two-dimensional front base image to the front face of the base element and application of the two-dimensional back base image to the back face of the base element;
   (f) adding the three-dimensional mounted element to the two-dimensional front face image;

(g) creating foreground UV maps for each of multiple two-dimensional transverse contour lines of the three-dimensional mounted element;
(h) using the foreground UV maps to coordinate application of the three-dimensional mounted image to the three-dimensional mounted element;
(i) exporting a final 3D model which incorporates the image foreground and the image background;
(j) importing the final 3D model into a 3D printing software; and
(k) using the 3D printing software in the 3D printer to produce the colored object.

* * * * *